United States Patent
Nagatomo et al.

(10) Patent No.: US 10,248,099 B2
(45) Date of Patent: Apr. 2, 2019

(54) PROGRAMMABLE LOGIC CONTROLLER, ENGINEERING TOOL, AND ENGINEERING TOOL PROGRAM

(71) Applicant: Mitsubishi Electric Corporation, Chiyoda-ku (JP)

(72) Inventors: Yoshihiro Nagatomo, Tokyo (JP); Yoshifumi Takakura, Nagoya (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/567,162

(22) PCT Filed: May 19, 2015

(86) PCT No.: PCT/JP2015/064308
§ 371 (c)(1),
(2) Date: Oct. 17, 2017

(87) PCT Pub. No.: WO2016/185558
PCT Pub. Date: Nov. 24, 2016

(65) Prior Publication Data
US 2018/0101159 A1 Apr. 12, 2018

(51) Int. Cl.
*G05B 19/05* (2006.01)
*G05B 15/02* (2006.01)

(52) U.S. Cl.
CPC ......... *G05B 19/058* (2013.01); *G05B 19/054* (2013.01); *G05B 15/02* (2013.01);
(Continued)

(58) Field of Classification Search
CPC ...... G05B 19/05; G05B 19/056; G05B 15/02; G05B 2219/13; G05B 2219/13018
See application file for complete search history.

(56) References Cited

U.S. PATENT DOCUMENTS 5,793,947 A 8/1998 Sakamoto
6,290,403 B1 * 9/2001 Onishi ............... G05B 19/0426
712/200
(Continued)

FOREIGN PATENT DOCUMENTS

DE       694 10 680 T2    12/1998
DE   10 2014 109 569 A1    1/2015
(Continued)

OTHER PUBLICATIONS

International Search Report dated Jul. 21, 2015, in PCT/JP2015/064308, filed May 19, 2015.
(Continued)

*Primary Examiner* — Ronald D Hartman, Jr.
(74) *Attorney, Agent, or Firm* — Oblon, McClelland, Maier & Neustadt, L.L.P.

(57) ABSTRACT

A programmable logic controller executes an SFC program including a plurality of blocks, each including a step indicating an operation output and a transition indicating a transition condition. The programmable logic controller includes an SFC device data collecting unit for collecting device data of a device included in an active step for each scan at the time when the SFC program is executed, an SFC device data storing unit for storing the data collected by the SFC device data collecting unit, and an SFC device data outputting unit for outputting the data stored in the SFC device data storing unit to a memory card as a file for each of the steps or the blocks.

6 Claims, 11 Drawing Sheets

(52) U.S. Cl.
CPC ........ *G05B 19/056* (2013.01); *G05B 2219/13* (2013.01); *G05B 2219/13018* (2013.01); *G05B 2219/14055* (2013.01); *G05B 2219/14098* (2013.01); *G05B 2219/14115* (2013.01)

(56) References Cited

U.S. PATENT DOCUMENTS

| | | | |
|---|---|---|---|
| 6,859,898 B1* | 2/2005 | Yamashita | G05B 19/056 700/26 |
| 8,612,886 B2* | 12/2013 | Silvestro | G05B 19/05 715/809 |
| 9,086,688 B2 | 7/2015 | Law et al. | |
| 9,483,041 B2* | 11/2016 | Kito | G05B 19/409 |
| 9,971,331 B2* | 5/2018 | Shimizu | G05B 19/0428 |
| 2008/0058969 A1* | 3/2008 | Nixon | G05B 19/0426 700/87 |
| 2008/0126973 A1* | 5/2008 | Kline | G05B 19/056 715/772 |
| 2009/0089674 A1* | 4/2009 | Silvestro | G05B 19/0426 715/711 |
| 2011/0099540 A1* | 4/2011 | Bae | G06F 11/3664 717/135 |
| 2013/0006391 A1* | 1/2013 | Kito | G05B 19/409 700/11 |
| 2013/0006396 A1* | 1/2013 | Kito | G05B 19/4093 700/83 |
| 2014/0058538 A1 | 2/2014 | Yaoita et al. | |
| 2015/0018977 A1 | 1/2015 | Law et al. | |
| 2015/0277425 A1 | 10/2015 | Law et al. | |
| 2016/0202685 A1* | 7/2016 | Shimizu | G05B 19/0426 700/87 |
| 2018/0031587 A1* | 2/2018 | Bierweiler | G01N 35/00584 |
| 2018/0059634 A1* | 3/2018 | Yamaoka | G05B 19/0426 |
| 2018/0341242 A1* | 11/2018 | Nagatomo | G05B 19/058 |

FOREIGN PATENT DOCUMENTS

| | | | |
|---|---|---|---|
| EP | 1089150 A2 * | 4/2001 | ........... G05B 19/056 |
| JP | 6-289928 A | 10/1994 | |
| JP | 8-63205 A | 3/1996 | |
| JP | 2001-5504 A | 1/2001 | |
| JP | 2001-154711 A | 6/2001 | |
| JP | 2001-195108 A | 7/2001 | |
| JP | 2001-195108 A5 | 7/2001 | |
| JP | 2001-282330 A | 10/2001 | |
| JP | 2010-176545 A | 8/2010 | |
| JP | 2013-15983 A | 1/2013 | |
| WO | 2012/124541 A1 | 9/2012 | |

OTHER PUBLICATIONS

Office Action dated Aug. 15, 2017, in Japanese Patent Application No. 2017-518660 (with English translation).
Office Action dated Nov. 28, 2018 in German Patent Application No. 11 2015 006 551.2, with English-language translation, 14 pages.

* cited by examiner

| ITEM | SETTING | |
|---|---|---|
| ☐ SFC SETTING | | |
| ⊢ DEVICE DATA COLLECTION SETTING | TO COLLECT DEVICE DATA | ▼ |
| ⊢ DEVICE DATA COLLECTION RANGE SETTING | ADVANCED SETTINGS | |

70, 71, 72

731, 73, 732

| DEVICE DATA COLLECTION RANGE SETTING | | | | ✕ |
|---|---|---|---|---|
| BLOCK NAME | RANGE OF STEP IN WHICH DEVICE DATA IS COLLECTED | | | |
| BLOCK [1] | STEP [0] | – | STEP [3] | |
| | | – | | |
| | | – | | |

PROGRAMMABLE LOGIC CONTROLLER, ENGINEERING TOOL, AND ENGINEERING TOOL PROGRAM

FIELD

The present invention relates to a programmable logic controller, an engineering tool, and an engineering tool program by which troubleshooting can be easily performed.

BACKGROUND

Conventionally, there has been a problem in a programmable logic controller that it takes time to perform troubleshooting in a case where a malfunction of a sequential function chart (SFC) program has been caused by an incorrect operation of a device value.

Patent Literature 1 discloses a programmable logic controller in which an SFC program and an output state of a device in the SFC program can be confirmed on a single screen for easy troubleshooting.

CITATION LIST

Patent Literature

Patent Literature 1: Japanese Patent Application Laid-Open No. 2001-195108

SUMMARY

Technical Problem

However, with a method disclosed in Patent Literature 1 described above, since a communication time between the programmable logic controller and the engineering tool is longer than an execution time of the SFC program, not all the device outputs within a step can be displayed. Also, in a case where the malfunction of the SFC program has occurred, with the method disclosed in Patent Literature 1, only the current device output state is displayed. Therefore, there has been a problem in that an operation process of the device cannot be retroactively confirmed.

The present invention has been made in consideration of the above problems. A purpose of the present invention is to obtain a programmable logic controller which can display all device outputs in a step and can retrospectively confirm an operation process of a device.

Solution to Problem

In order to solve the problems and achieve the object, according to an aspect of the present invention, there is provided a programmable logic controller for executing a sequential function chart program including a plurality of blocks, each including a first basic unit indicating an operation output and a second basic unit indicating a transition condition, the programmable logic controller including: a device data collecting unit to collect device data of a device included in an active first basic unit for each scan at the time when the sequential function chart program is executed; a device data storing unit to store the data collected by the device data collecting unit; and a device data outputting unit to output the data stored in the device data storing unit to a storage medium as a file for each of the first basic units or the blocks.

Advantageous Effects of Invention

A programmable logic controller according to the present invention obtains an effect that the programmable logic controller can display ail device outputs in a step and can retrospectively confirm an operation process of a device.

DESCRIPTION OF EMBODIMENTS

A programmable logic controller, an engineering tool, and an engineering fool program according to embodiments of the present invention are described in detail below with reference to the drawings. The present invention is not limited to the embodiments.

First Embodiment

Figure 1:
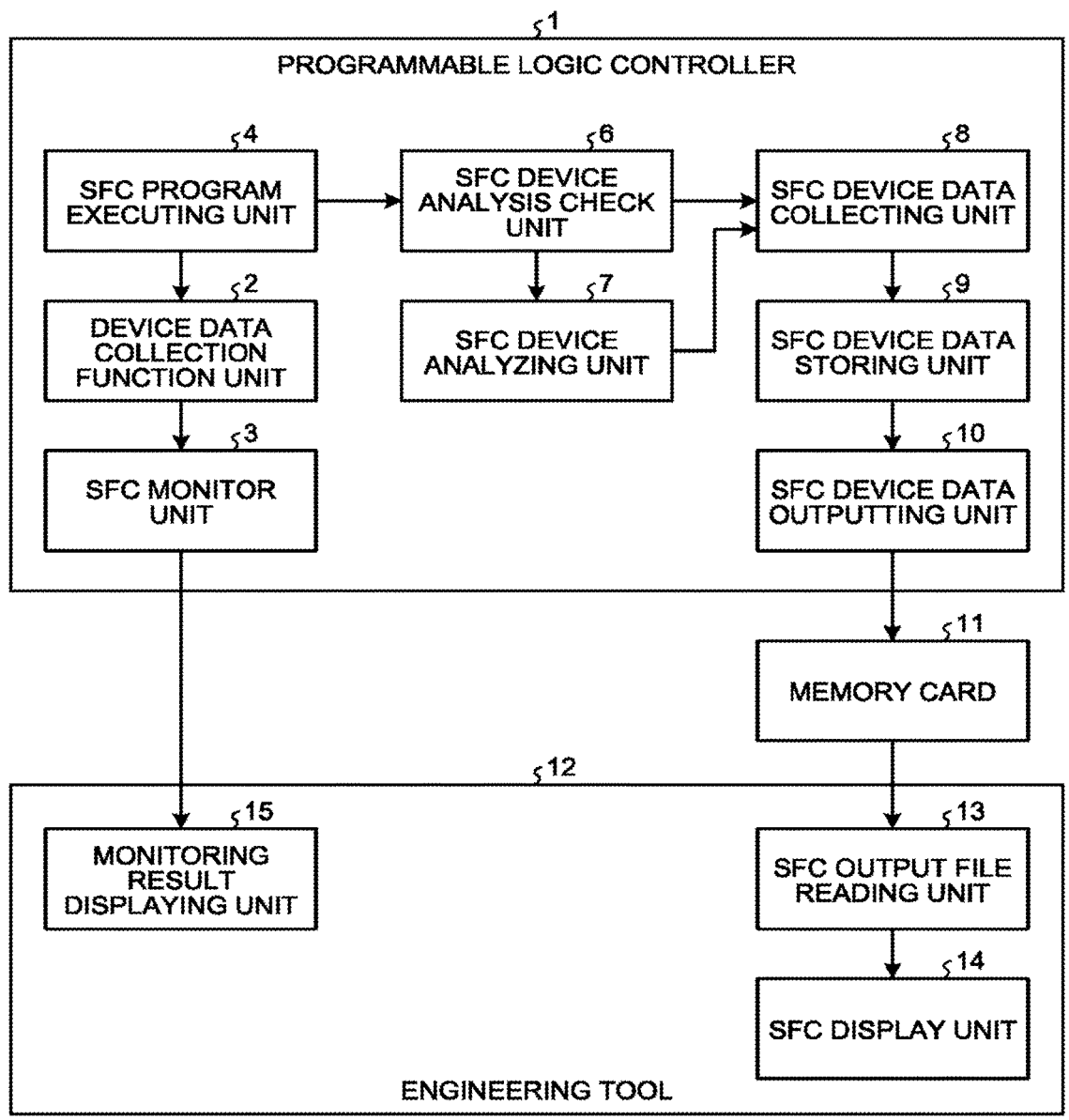
FIG. 1 is a diagram illustrating configurations of a programmable logic controller and an engineering tool according to a first embodiment of the present invention.

FIG. 1 is a diagram illustrating configurations of a programmable logic controller and an engineering tool according to a first embodiment of the present invention. A programmable logic controller 1 according to the first embodiment includes a device data collection function unit 2 which collects device data and an SFC monitor unit 3 which monitors an SFC program including a step which is a first, basic unit indicating an operation output and a transition which is a second basic unit indicating a transition condition and transmits the monitoring result to an engineering tool 12. Further, the programmable logic controller 1 includes an SFC program executing unit 4 which executes the SFC program, an SFC device analysis check unit 6 which is a device analysis check unit for confirming whether a device in the step has been analyzed, an SFC device analyzing unit 7 which is a device analyzing unit for analyzing the device data in the step at the time when the programmable logic controller 1 has been turned on or after the program in the step has been executed, an SFC device data collecting unit 8 which is a device data collecting unit for collecting a device output state at the time when the step is activated, an SFC device data storing unit 9 which is a device data storing unit for storing the collected device output state, and an SFC device data outputting unit 10 which is a device data outputting unit for performing file outputting the device output state stored in the SFC device data storing unit 9 to a memory card 11 which is a storage medium for each step. The SFC device data storing unit 9 has a ring buffer structure, and old information is rewritten to new information in order. The storage medium for storing the device output state is not limited to the memory card 11.

Figure 2:
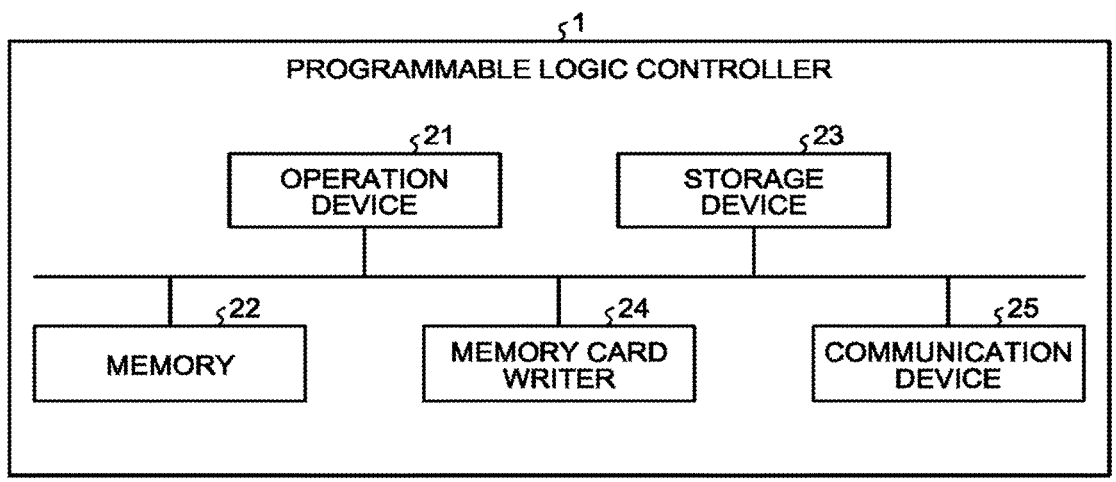
FIG. 2 is a diagram illustrating a hardware configuration of the programmable logic controller according to the first embodiment.

FIG. 2 is a diagram illustrating a hardware configuration of the programmable logic controller according to the first embodiment. The programmable logic controller 1 includes an operation device 21 for executing a program, a memory 22 used for a work area by the operation device 21, a storage device 23 for storing a program and data, a memory card writer 24 for recording information in the memory card 11, and a communication device 25 for communicating with the engineering tool 12. A central processing unit (CPU) can be applied to the operation device 21. A random access memory (RAM) can be applied to the memory 22. A non-volatile semiconductor memory can be applied to the storage device 23. Note that the memory card writer 24 may be externally attached to the programmable logic controller 1.

The operation device 21 uses the memory 22 as the work area and executes software so as to realize the device data collection function unit 2, the SFC program executing unit 4, the SFC device analysis check unit 6, the SFC device analyzing unit 7, and the SFC device data collecting unit 8 illustrated in FIG. 1. Also, a plurality of operation devices and a plurality of memories may cooperate to execute the above functions. The SFC monitor unit 3 is realized by the operation device 21 and the communication device 25. The SFC device data storing unit 9 is realized by the storage device 23. The SFC device data outputting unit 10 is realized by the memory card writer 24.

As illustrated in FIG. 1, the engineering tool 12 includes an SFC output file reading unit 13 which reads a file from the memory card 11, an SFC display unit 14 which superimposes the device data read by the SFC output file reading unit 13 on the SFC program and displays the data, and a monitoring result displaying unit 15 which receives the monitoring result of the SFC program from the programmable logic controller 1 and displays the result.

Figure 3:
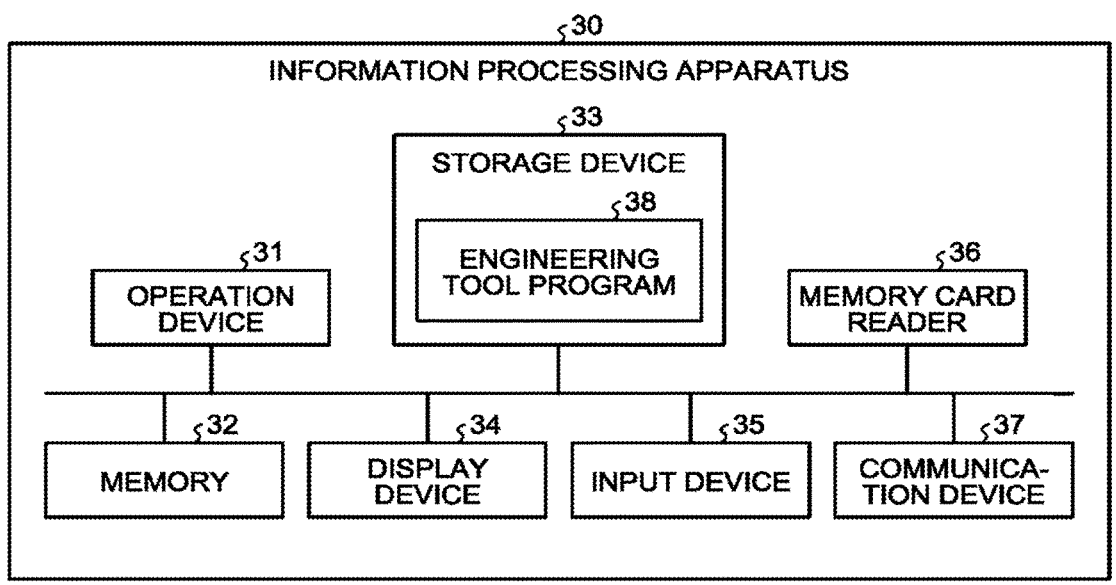
FIG. 3 is a diagram illustrating a hardware configuration of an information processing apparatus that realizes the engineering tool according to first embodiment.

FIG. 3 is a diagram illustrating a hardware configuration of an information processing apparatus that realizes the engineering tool according to first embodiment. An information processing apparatus 30 includes an operation device 31 for executing a program, a memory 32 used for a work area by the operation device 31, a storage device 33 for storing an engineering tool program 38 and data, a display device 34 for displaying information, an input device 35 which is a user interface for a user to input information, a memory card reader 36 for reading information from the memory card 11, and a communication device 37 for communicating with the programmable logic controller 1. A central processing unit (CPU) can be applied to the operation device 31. A random access memory (RAM) can be applied to the memory 32. A non-volatile semiconductor memory or a hard dish drive can be applied to the storage device 33. A liquid crystal display can be applied to the display device 34. A keyboard and a mouse can be applied to the input device 35. The memory card reader 36 may be externally attached to the information processing apparatus 30. It is not necessary for the display device 34 and the input device 35 to be housed in a casing integrated with the operation device 31, the memory 32, and the storage device 33.

In the information processing apparatus 30, the operation device 31 executes the engineering tool program 38 stored in the storage device 33 by using the memory 32 as a work area so as to be the engineering tool 12. That is, the SFC display unit 14 illustrated in FIG. 1 is realized by executing the engineering tool program 38 stored in the storage device 33 by using the memory 32 as the work area by the operation device 31. Also, a plurality of operation devices and a plurality of memories may cooperate to execute the above functions. The SFC output file reading unit 13 is realized by the memory card reader 36. The monitoring result displaying unit 15 is realized by the operation device 31, the display device 34, and the communication device 37.

Figure 4:
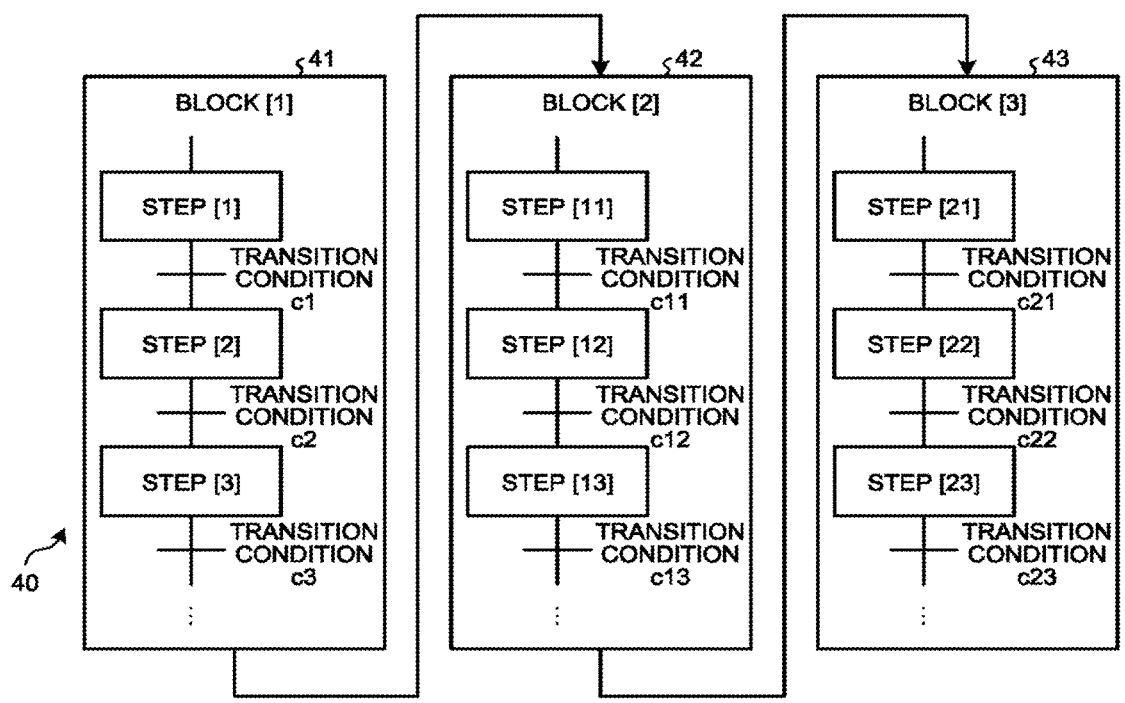
FIG. 4 is a diagram illustrating a configuration of an SFC program executed by the programmable logic controller according to the first embodiment.

FIG. 4 is a diagram illustrating a configuration of the SFC program executed by the programmable logic controller according to the first embodiment. An SFC program 40 is described in a description format of a control specification in which a series of a control operations is divided into a plurality of steps and an operation order and an operation condition of the program can be clearly expressed. The SFC program 40 includes three blocks, i.e., a block [1] 41, a block [2] 42, and a block [3] 43. The block [1] 41 includes a plurality of steps such as a step [1], a step [2], a step [3] . . . , and a plurality of transitions. Each step is a first basic unit forming the block and indicates an operation output. Each transition is a second basic unit forming the block and indicates a condition to move to the next step. If a transition condition c1 is satisfied at the time when the step [1] is active, the step [2] becomes active, and the step [1] becomes inactive. If a transition condition c2 is satisfied at the time when the step [2] is active, the step [3] becomes active, and the step [2] becomes inactive. If a transition condition c3 is satisfied at the time when the step [3] is active, the step [3] becomes inactive, and the next step becomes active.

The block [2] 42 includes a plurality of steps such as a step [11], a step [12], a step [13], . . . . If a transition condition c11 is satisfied at the time when the step [11] is active, the step [12] becomes active, and the step [11] becomes inactive. If a transition condition c12 is satisfied at the time when the step [12] is active, the step [13] becomes active, and the step [12] becomes inactive. If a transition condition c13 is satisfied at the time when the step [13] is active, the step [13] becomes inactive, and the next step becomes active.

The block [3] 43 includes a plurality of steps such as a step [21], a step [22], a step [23], . . . . If a transition condition c21 is satisfied at the time when the step [21] is active, the step [22] becomes active, and the step [21] becomes inactive. If a transition condition c22 is satisfied at the time when the step [22] is active, the step [23] becomes active, and the step [22] becomes inactive. If a transition condition c23 is satisfied at the time when the step [23] is active, the step [23] becomes inactive, and the next step becomes active.

Figure 5:
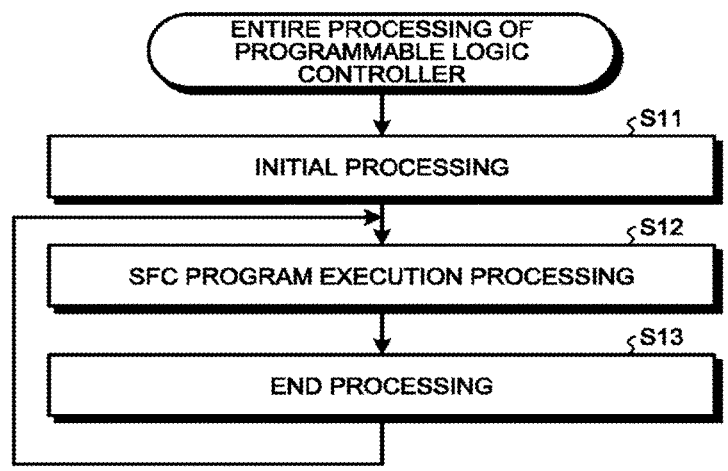
FIG. 5 is a flowchart illustrating a flow of a device data collection operation of the programmable logic controller according to the first embodiment.

An operation of the programmable logic controller 1 according to the first embodiment is described. FIG. 5 is a flowchart illustrating a flow of a device data collection operation of the programmable logic controller according to the first embodiment. In step S11, the SFC program executing unit 4 performs initial processing. In step 312, the SFC program executing unit 4 performs SFC program execution processing. In step S13, the SFC program executing unit 4 performs end processing. The processing in steps S12 and S13 is executed in one scan which is an operation cycle of the programmable logic controller 1.

Figure 6:
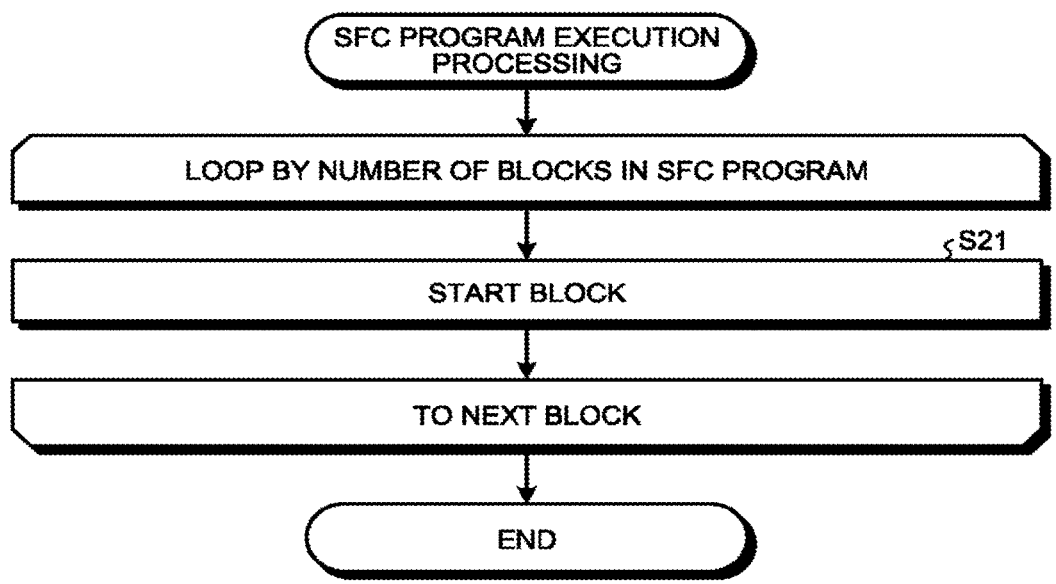
FIG. 6 is a flowchart illustrating a flew of SFC program execution processing of the programmable logic controller according to the first embodiment.

FIG. 6 is a flowchart illustrating a flow of the SFC program execution processing of the programmable logic controller according to the first embodiment. In the SFC program execution processing, loop processing is performed by the number of blocks in the SFC program. In the loop processing, block start processing is performed in step S21. After looping by the number of blocks in the SFC program, the SFC program executing unit 4 terminates the SFC program execution processing.

Figure 7:
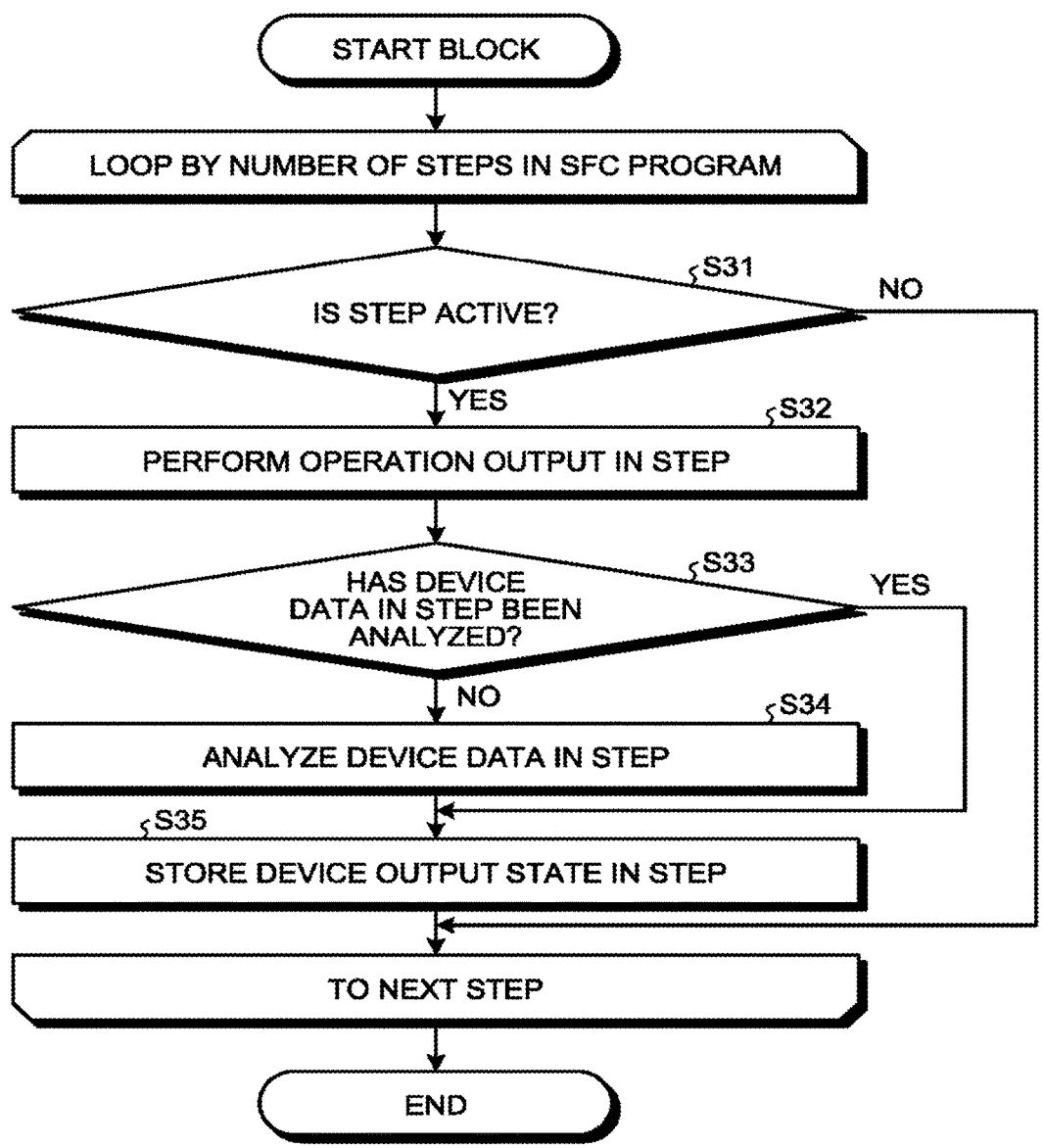
FIG. 7 is a flowchart illustrating a flow of block start processing of the programmable logic controller according to the first embodiment.

FIG. 7 is a flowchart illustrating a flow of the block start processing of the programmable logic controller according to the first embodiment. In the block start processing, the loop processing is performed by the number of steps in the block. In the loop processing, the SFC program executing unit 4 determines in step S31 whether the step in the SFC program is active. If the step in the SFC program is not active, the result in step S31 is No, and the loop processing is terminated. Then, the loop processing is performed for the next step. If the step in the SFC program is active, the result in step S31 is Yes, and the SFC program executing unit 4 performs the operation output in the step in step S32.

Subsequently, in step S33, the SFC device analysis check unit 6 determines whether the device in the step has been analyzed. If the device has been analyzed, the result in step S33 is Yes, and the procedure proceeds to step S35. If the device has not been analyzed, the result in step S33 is No, and the SFC device analyzing unit 7 analyzes the device in the step in step S34. When the SFC device analyzing unit 7 analyzes the device in the step, a storage region for the analyzed step is formed in the SFC device data storing unit 9. Since the SFC device data storing unit 9 has a ring buffer structure, in a case where there is no free space in the storage device 23, the oldest storage region in the SFC device data storing unit 9 is rewritten to a storage region for the step in which the device is newly analyzed. In step S35, the SFC device data collecting unit 8 makes the SFC device data storing unit 9 store the device output state in the step. After looping by the number of steps in the SFC program, the SFC device data collecting unit 8 terminates the processing.

Through the above processing, the SFC device data collecting unit 8 specifies the active step in the SFC program and makes the SFC device data storing unit 9 store the device data.

Figure 8:
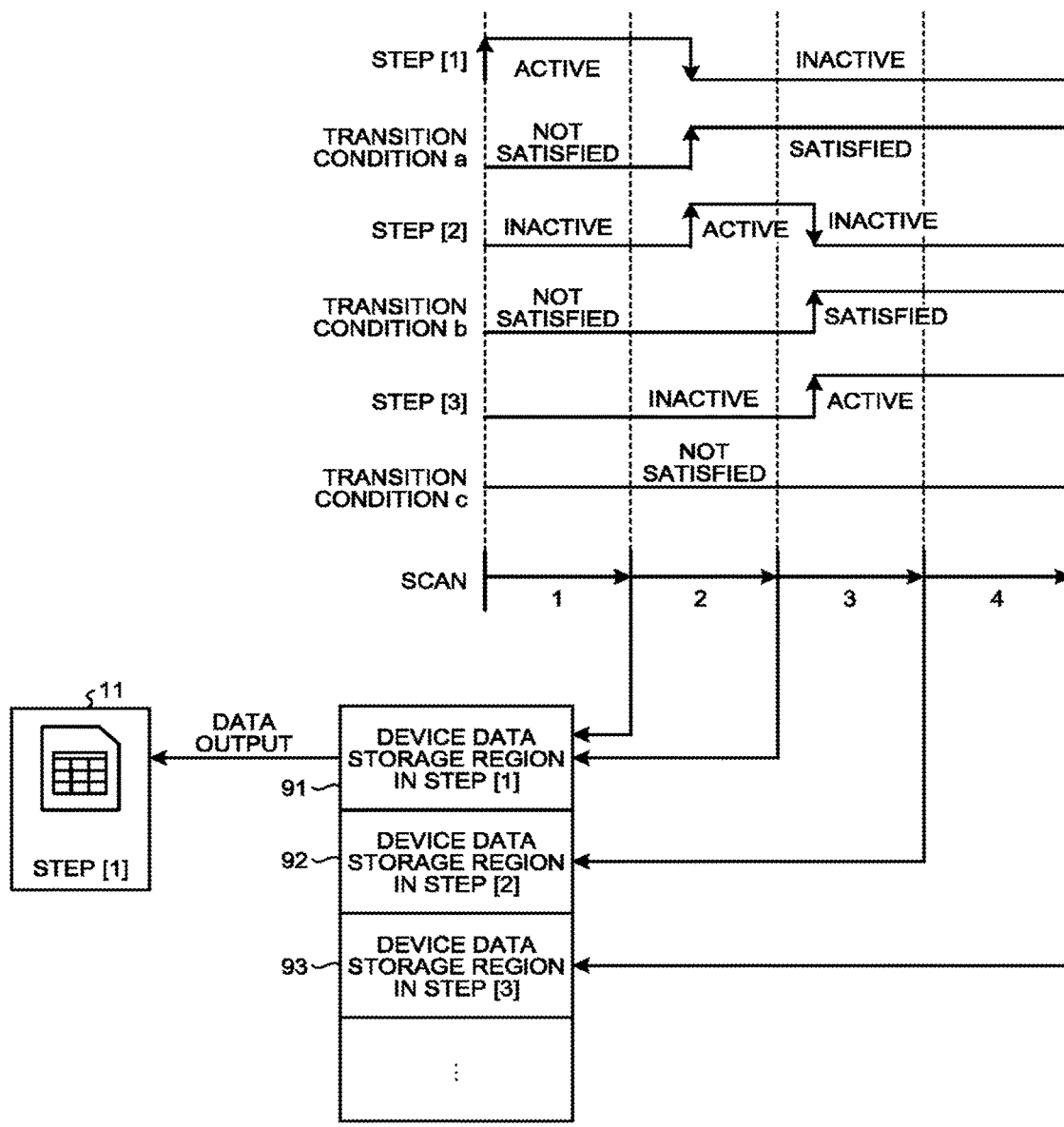
FIG. 8 is a diagram schematically illustrating a timing of data collection by the programmable logic controller according to the first embodiment.

FIG. 8 is a diagram schematically illustrating a timing of data collection by the programmable logic controller according to the first embodiment. In a first scan, since a step [1] is active at the time when the scan starts, the SFC device data collecting unit 8 stores device data of the step [1] in a storage region 91 for the step [1] in the SFC device data storing unit 9. In a second scan, a transition condition a is satisfied during the scan, the step [1] becomes inactive, and a step [2] is active. However, since the step [1] is active at the time when the scan starts, the SFC device data collecting unit 8 stores the device data of the step [1] in the storage region 91 for the step [1] in the SFC device data storing unit 9. In a third scan, a transition condition b is satisfied during the scan, the step [2] becomes inactive, and the step [3] is active. However, since the step [2] is active at the time when the scan starts, the SFC device data collecting unit 8 stores the device data of the step [2] in a storage region 92 for the step [2] In the SFC device data storing unit 9. In a fourth scan, since the step [3] is active at the time when the scan starts, the SFC device data collecting unit 8 stores device data of the step [3] in a storage region 93 for the step [3] in the SFC device data storing unit 9.

The device data stored in the SFC device data storing unit 9 is output to the memory card 11 by the SFC device data outputting unit 10 when the step is inactive. As an example, the device data of the step [1] stored in the storage region 91 for the step [1] is output to the memory card 11 by the SFC device data outputting unit 10 after the third scan. In the memory card 11, the device data is stored as a file in units of steps or blocks.

Figure 9:
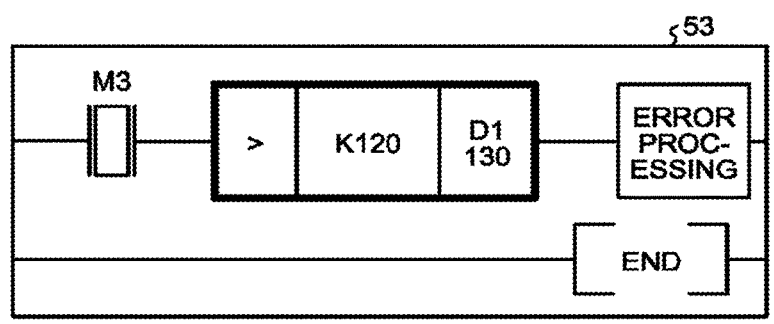
FIG. 9 is a diagram illustrating exemplary troubleshooting by the engineering tool according to first embodiment.
Figure 10:
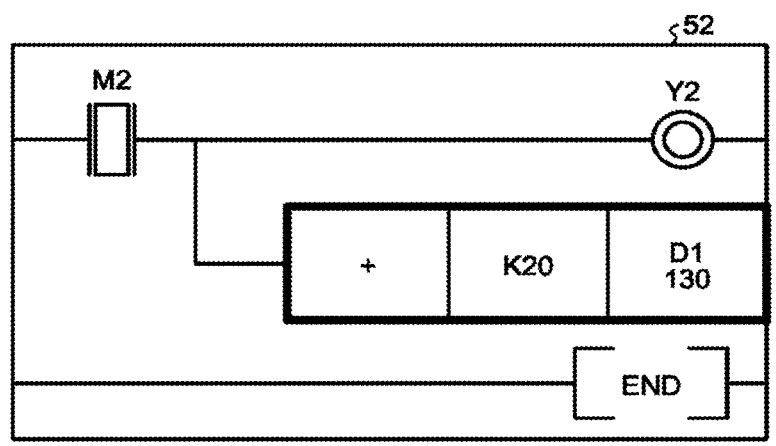
FIG. 10 is a diagram illustrating exemplary troubleshooting by the engineering tool according to first embodiment.
Figure 11:
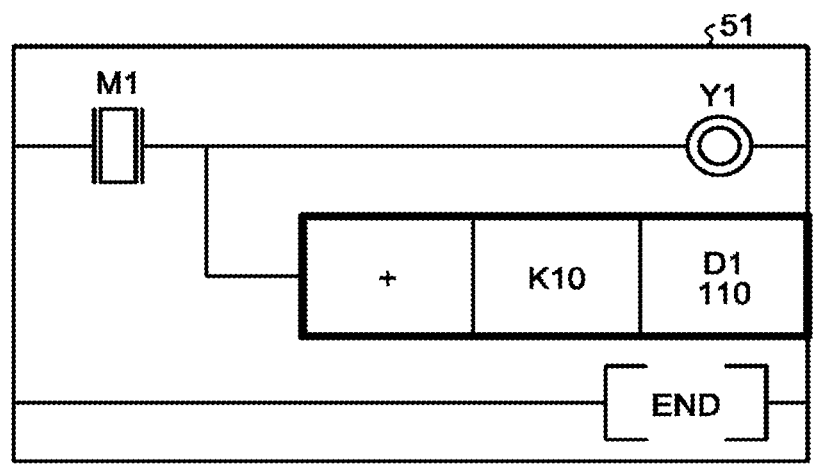
FIG. 11 is a diagram illustrating exemplary troubleshooting by the engineering tool according to first embodiment.

When troubleshooting is performed by using the engineering tool 12, an operation process of the device is retroactively confirmed from a place in the SFC program where an incorrect operation has occurred to specify the place where the incorrect operation has occurred. When the SFC monitor unit 3 detects that the incorrect operation has occurred in the step [3] in the SFC program, the monitoring result displaying unit 15 displays the monitoring result on the engineering tool 12. Therefore, the user starts troubleshooting from the step [3] in the SFC program. FIGS. 9, 10, and 11 are diagrams illustrating exemplary troubleshooting by the engineering tool according to the first embodiment. First, the device data in the step [3] in the SFC program is read from the memory card 11 by the SFC output file reading unit 13 and is displayed on the SFC display unit 14. In FIG. 9, a device data display screen 53 in the step [3] is illustrated. From the device data display screen 53 in the step [3] in the SFC program, it can be confirmed that the incorrect operation occurs when a value of a device D1 is larger than 120 and that the value of the device D1 is 130.

Next, in the SFC program, the device data in the step [2], which is the step preceding the step [3], is read from the memory card 11 by the SFC output file reading unit 13 and is displayed on the SFC display unit 14. In FIG. 10, a device data display screen 52 in the step [2] is illustrated. From, the device data display screen 52 in the step [2], it can be confirmed that the value of the device D1 has reached 130 as a result of adding 20 to the device D1.

Next, in the SFC program, the device data in the step [1], which is the step preceding the step [2], is read from the memory card 11 by the SFC output file reading unit 13 and is displayed on the SFC display unit 14. In FIG. 11, a device data display screen 51 in the step [1] is illustrated. From the device data display screen 51 in the step [1], it can be confirmed that the value of the device D1 has reached 110 as a result of adding 10 to the device D1.

It can be specified that the incorrect operation is caused by adding 20 to the value of the device D1 in the step [2] based on the device data display screen 53 in the step [3] illustrated in FIG. 9, the device data display screen 52 in the step [2] illustrated in FIG. 10, and the device data display screen 51 in the step [1] illustrated in FIG. 11.

As described above, by displaying the device data output to the memory card 11 on the engineering tool 12, the device data can be confirmed by using a graphical user interface for displaying the SFC program. The troubleshooting can be more easily performed by confirming the device data by using the graphical user interface for displaying the SFC program than a case where the device data is confirmed based on numerical data by using spreadsheet software.

In the above operation, the device in the step is analyzed when the operation output in the step is executed. However, when the programmable logic controller is turned on, the device in each step of the SFC program may be analyzed. If the device in each step of the SFC program is analyzed when the programmable logic controller is turned on, the processing in step S33 for determining whether the device in the step has been analyzed and the processing in step S34 for analyzing the device in the step can be omitted at the time when the SFC program is executed. Therefore, an execution speed of the SFC program can be increased. However, the storage region for each step is secured in the SFC device data storing unit at the time of the analysis of the device in the step. Therefore, if the device is analyzed when the programmable logic controller is turned on, a storage capacity which can secure device data storing units for all the steps in the SFC program is required for the storage device for realizing the SFC device data storing unit. Therefore, it is preferable to determine whether the device is analyzed when the programmable logic controller is turned on based on the number of the steps in the SFC program and the storage capacity of the storage device.

According to the first embodiment, since the device data is collected for each step in the SFC program, all the device outputs in the step can be displayed, and the operation process of the device can be retroactively confirmed.

Second Embodiment

Figure 12:
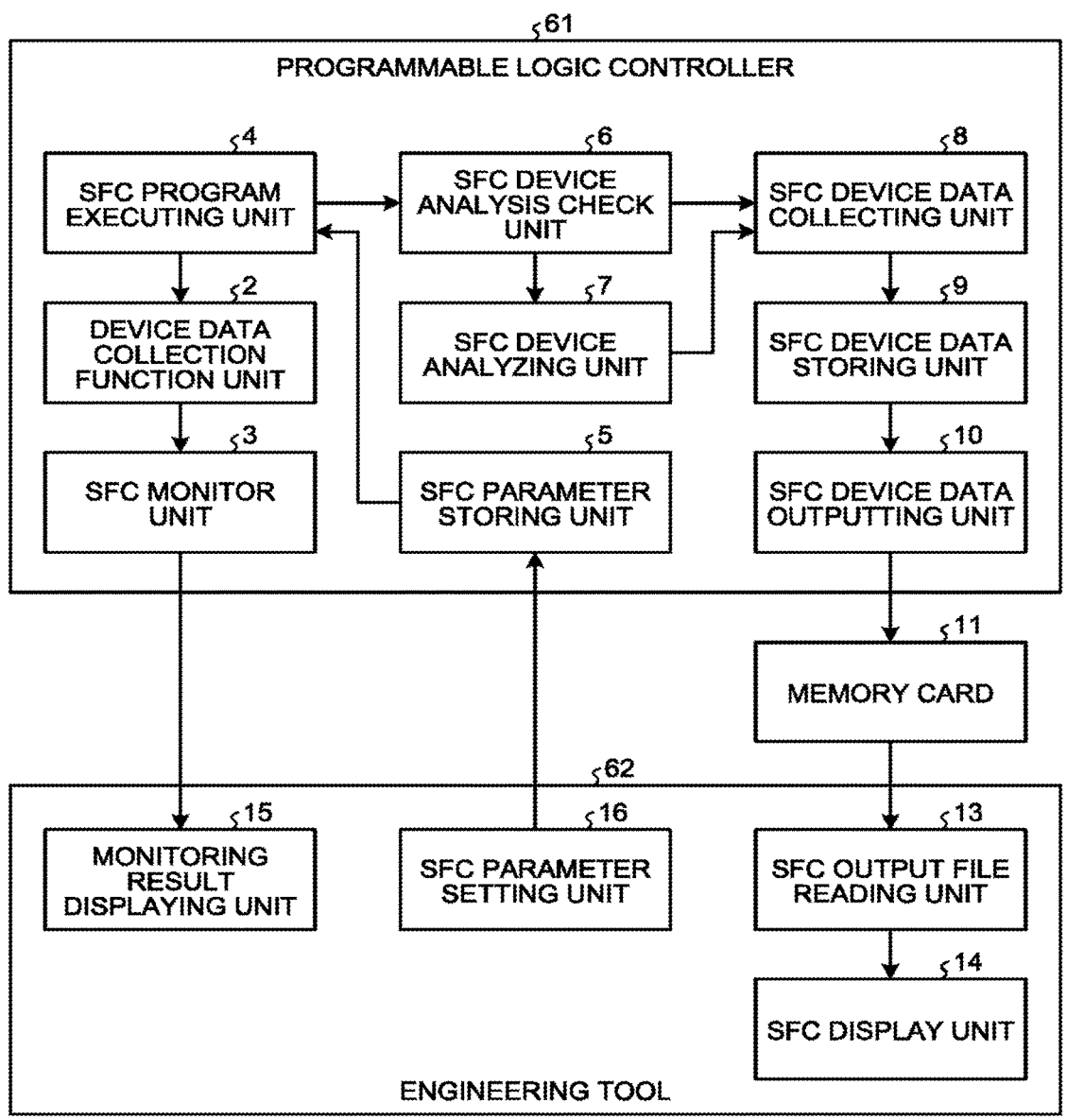
FIG. 12 is a diagram illustrating configurations of a programmable logic controller and an engineering tool according to a second embodiment of the present invention.

FIG. 12 is a diagram illustrating configurations of a programmable logic controller and an engineering tool according to a second embodiment of the present invention. A programmable logic controller 61 according to the second embodiment is different from the programmable logic controller 1 according to the first embodiment in that an SFC parameter storing unit 5 for storing whether to collect device data and parameters for respectively setting ranges of the steps to be collected for each block is included. In the second embodiment, an SFC program executing unit 4 executes an SFC program according to the settings of the SFC parameters.

A hardware configuration of the programmable logic controller 61 is similar to that of the programmable logic controller 1 according to the first embodiment. Therefore, the SFC parameter storing unit 5 illustrated in FIG. 12 is realized by a storage device 23.

As illustrated in FIG. 12, an engineering tool 62 according to the second embodiment is different from the engineering tool 12 according to the first embodiment in that an SFC parameter setting unit 16 for switching whether the device data is collected and setting a range of a step in which the device data is collected is included.

A hardware configuration of an information processing apparatus for realizing the engineering tool 62 according to the second embodiment is similar to that of the first embodiment. Therefore, the SFC parameter setting unit 16 illustrated in FIG. 12 is realized by executing an engineering tool program 38 stored in a storage device 33 by using a memory 32 as a work area by an operation device 31.

Figures 13, 14:
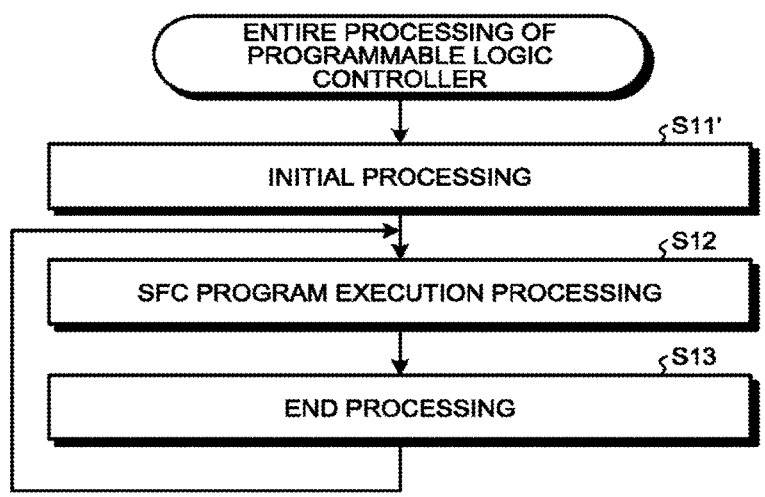
FIG. 13 is a diagram illustrating an exemplary SFC parameter setting screen of the engineering tool according to the second embodiment.
FIG. 14 is a flowchart illustrating a flow of a device data collection, operation of the programmable logic controller according to the second embodiment.

FIG. 13 is a diagram illustrating an exemplary SFC parameter setting screen of the engineering tool according to the second embodiment. In an SFC parameter setting screen 70, a device data collection setting field 71 and a device data collection range setting field 72 are provided. The device data collection setting field 71 is provided in a form of a pull-down menu, and can alternatively select "to collect the device data" or "not to collect the device data". When the device data collection range setting field 72 is selected, a device data collection range setting dialog 73 is displayed in a pop-up. The device data collection range setting dialog 73 includes a block name specifying field 731 and a collection range specifying field 732. In FIG. 13, setting is made to collect the device data between a step [0] to a step [3] of a block [1].

FIG. 14 is a flowchart illustrating a flow of a device data collection operation of the programmable logic controller according to the second embodiment. Initial processing in step S11' is different from the initial processing in step S11 according to the first embodiment in that processing for obtaining a parameter set to the SFC parameter setting unit 16 by the engineering tool 62 is included.

The flow of the SFC program execution processing of the programmable logic controller 61 according to the second embodiment is similar to that of the first embodiment.

Figure 15:
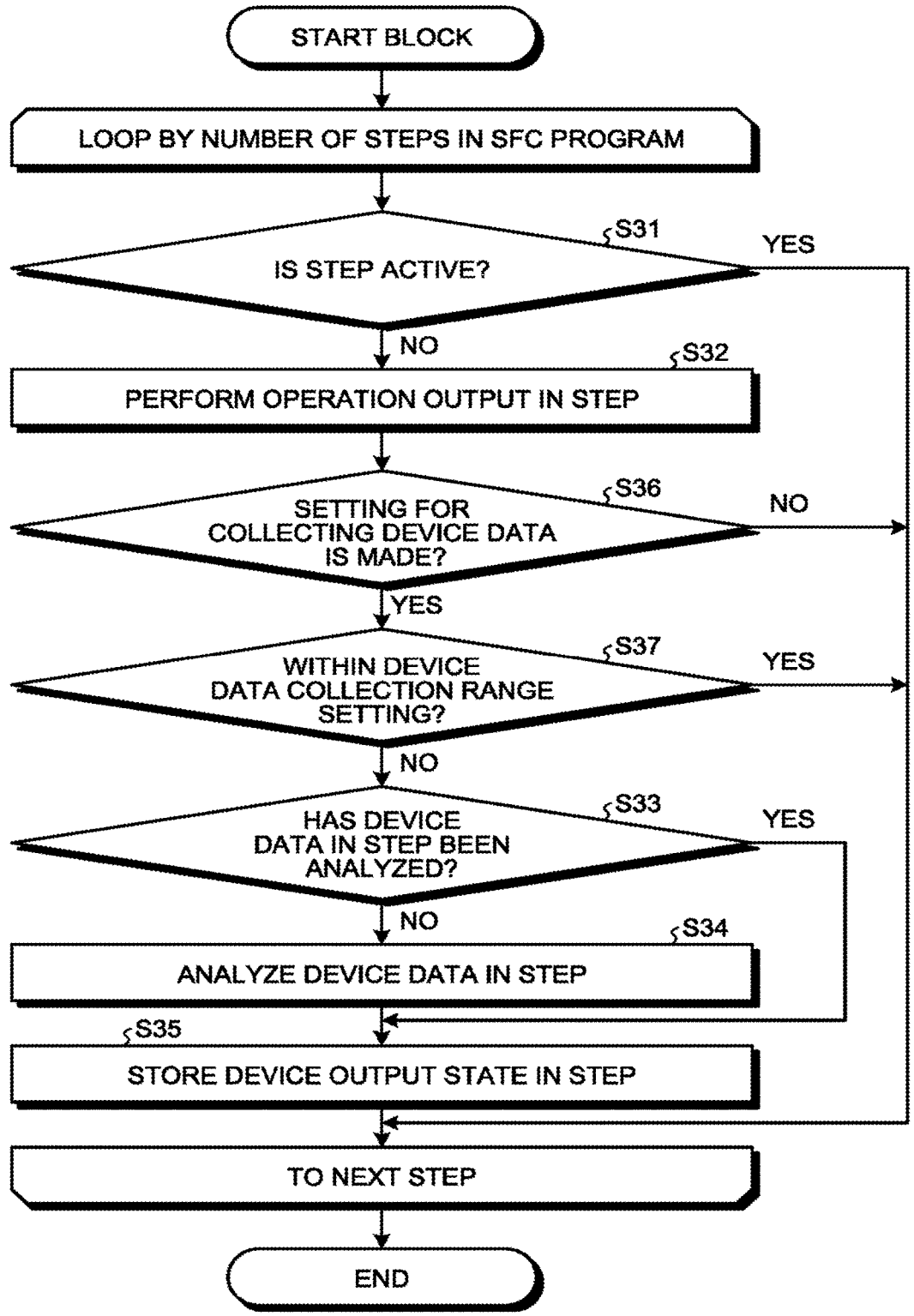
FIG. 15 is a flowchart illustrating a flow of block start processing of the programmable logic controller according to the second embodiment.

FIG. 15 is a flowchart illustrating a flow of block start processing of the programmable logic controller according to the second embodiment. Compared with the block start processing of the programmable logic controller 1 according to the first embodiment, the block start processing in the second embodiment is different from the block start processing of the programmable logic controller 1 according to the first embodiment in that step S36 which is processing for confirming an SFC parameter and step S37 which is processing for confirming whether the device data is within the device data collection range are included.

In step S36, the SFC device data collecting unit 8 confirms whether the SFC parameter is set to collect the device data. The SFC parameter is set to collect the device data, the result in step S36 is Yes, and the SFC device data collecting unit 8 confirms in step S37 whether the device data is within the device data collection range. If the device data is within the device data collection range, the result in step S37 is Yes, and the procedure proceeds to step S33.

If the SFC parameter is set not to collect the device data, the result in step S36 is No, and the processing is terminated. If the device data is out of the device data collection range, the result in step S37 is No, and the processing is terminated.

When the device data in the step is collected with no conditions, a scan time of the programmable logic controller is deteriorated. The programmable logic controller 61 according to the second embodiment switches whether to collect the device data in the step by SFC parameter for each block and can set the device data collection range for each step in a case where the device data in the step is collected. Therefore, the device data can be collected when the troubleshooting is required. Therefore, the deterioration in the scan time of the programmable logic controller 61 at the time of the normal operation can be prevented.

The structures illustrated in the above embodiment indicate exemplary contents of the present invention and can be combined with other known technique. Further, the structures illustrated in the embodiment can be partially omitted and changed without departing from the scope of the present invention.

REFERENCE SIGNS LIST 1, 61 programmable logic controller, 2 device data collection function unit, 3 SFC monitor unit, 4 SFC program executing unit, 5 SFC parameter storing unit, 6 SFC device analysis check unit, 7 SFC device analyzing unit, 8 SFC device data collecting unit, 9 SFC device data storing unit, 10 SFC device data outputting unit, 11 memory card, 12, 62 engineering tool, 13 SFC output file reading unit, 14 SFC display unit, 15 monitoring result displaying unit, 16 SFC parameter setting unit, 21, 31 operation device, 22, 32 memory, 23, 33 storage device, 24 memory card writer, 25, 37 communication device, 30 information processing apparatus, 34 display device, 35 input device, 36 memory card reader, 38 engineering tool program, 41 block [1], 42 block [2], 43 block [3], 51, 52, 53 device data display screen, 70 SFC parameter setting screen, 71 device data collection setting field, 72 device data collection range setting field, 73 device data collection range setting dialog, 91, 92, 93 storage region, 731 block name setting field, 732 collection range specifying field.

The invention claimed is:

1. A programmable logic controller for executing a sequential function chart program including a plurality of blocks, each including a first basic unit indicating an operation output and a second basic unit indicating a transition condition, the programmable logic controller comprising:
   a device data collector to selectively collect device data of a device included in the first basic unit which is active among the first basic units for each scan at the time when the sequential function chart program is executed;
   a device data storage to store the data collected by the device data collector; and
   a device data outputter to output the data stored in the device data storage to a storage medium as a file for each of the first basic units or the blocks.

2. The programmable logic controller according to claim 1, comprising:
   a parameter storage to store a parameter in which whether to collect the device data and the first basic unit for collecting the device data are set for each of the blocks.

3. An engineering tool for monitoring an operation of a programmable logic controller that executes a sequential function chart program including a plurality of blocks, each including a first basic unit indicating an operation output and a second basic unit indicating a transition condition, the engineering tool comprising:
   an output file reader to read a file from a storage medium in which device data of a device included in the first basic unit which is active among the first basic units at the time when the sequential function chart program is executed by the programmable logic controller is selectively collected and to which the device data has been written in a file for each of the first basic units or the blocks; and
   a display to display the device data read by the output file reading unit by superimposing the device data on the sequential function chart program.

4. The engineering tool according to claim 3, comprising:
   a sequential function chart parameter setter to set a parameter indicating whether to collect the device data and a range of the first basic unit for collecting the device data for each of the blocks.

5. A non-transitory recording medium which stores an engineering tool program causing a computer to monitor an operation of a programmable logic controller, and to perform a method comprising:
   reading device data from a storage medium in which the device data of a device included in a first basic unit which is active among a plurality of first basic storage units at a time when a sequential function chart program is executed by a programmable logic controller is selectively collected and to which the device data has been written in a file for each of first basic units or blocks, the programmable logic controller executing the sequential function chart program including the plurality of blocks, each including the first basic unit indicating an operation output and a second basic unit indicating a transition condition; and
   superimposing the device data in the file read from the storage medium on the sequential function chart program and displaying the data.

6. The non-transitory recording medium according to claim 5 comprising:
   setting a parameter that indicates whether to collect the device data and a range of the first basic unit for collecting the device data for each of the blocks.

* * * * *